(12) United States Patent
Tateshita et al.

(10) Patent No.: US 8,419,337 B2
(45) Date of Patent: Apr. 16, 2013

(54) GATE VALVE AND SUBSTRATE PROCESSING SYSTEM USING SAME

(75) Inventors: Koichi Tateshita, Nirasaki (JP); Tetsuya Mochizuki, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 375 days.

(21) Appl. No.: 12/849,465

(22) Filed: Aug. 3, 2010

(65) Prior Publication Data

US 2011/0033266 A1    Feb. 10, 2011

(30) Foreign Application Priority Data

Aug. 4, 2009  (JP) .................................. 2009-181613
Apr. 27, 2010  (JP) .................................. 2010-102376

(51) Int. Cl.
    *H01L 21/677*    (2006.01)
(52) U.S. Cl.
    USPC .......................................... 414/217; 251/326
(58) Field of Classification Search ................. 414/217; 251/326, 329
    See application file for complete search history.

(56) References Cited

U.S. PATENT DOCUMENTS

| | | | | |
|---|---|---|---|---|
| 3,368,792 | A * | 2/1968 | Schertler | 251/158 |
| 3,554,486 | A | 1/1971 | Thebado | |
| 3,973,753 | A * | 8/1976 | Wheeler | 251/204 |
| 4,052,036 | A * | 10/1977 | Schertler | 251/144 |
| 4,238,111 | A * | 12/1980 | Norman | 251/193 |
| 6,612,546 | B2 * | 9/2003 | Young et al. | 251/195 |

FOREIGN PATENT DOCUMENTS

| | | |
|---|---|---|
| JP | 5-196150 | 8/1993 |
| KR | 10-2009-0037337 | 4/2009 |

OTHER PUBLICATIONS

KR 10-2009-0037337 (Cheutomu et al.) Apr. 15, 2009 (English language machine translation of Korean publication already of record on applicant's IDS received Nov. 11, 2011). [online] [retrieved on Oct. 5, 2012]. Retrieved from K-PION (http://kposd.kipo.go.kr:8088/up/kpion/).*
Office Action issued Aug. 30, 2011, in Korean Patent Application No. 10-2010-0074976 with English translation.
Korean Office Action issued Apr. 13, 2012 in Patent Application No. 10-2010-0074976 with English Translation.

* cited by examiner

*Primary Examiner* — Saul Rodriguez
*Assistant Examiner* — Jonathan Snelting
(74) *Attorney, Agent, or Firm* — Oblon, Spivak, McClelland, Maier & Neustadt, L.L.P.

(57) ABSTRACT

A gate valve includes a valve body to be pressed against a peripheral surface around opening through which a processing target object is loaded and unloaded, pressed members arranged on a surface of the valve body around the opening, a main slider which slides in a direction parallel to the peripheral surface around the opening and pressing mechanisms, provided at the main slider, for pressing the respective pressed members. Each of the pressing mechanisms includes a cam having a protrusion for pressing the valve body against the peripheral surface around the opening and an inclined portion sloping downward from the protrusion. The pressing mechanisms serve to press the valve body in a direction substantially perpendicular to the peripheral surface around the opening in a state that the valve body is positioned to face the opening, so that the valve body is pressed against the peripheral surface around the opening.

20 Claims, 11 Drawing Sheets

GATE VALVE AND SUBSTRATE PROCESSING SYSTEM USING SAME

CROSS-REFERENCE TO RELATED APPLICATIONS

This application claims priority to Japanese Patent Application Nos. 2009-181613 filed on Aug. 4, 2009; and 2010-102376 filed on Apr. 27, 2010, the entire contents of which are incorporated herein by reference.

FIELD OF THE INVENTION

The present invention relates to a gate valve and a substrate processing system using same.

BACKGROUND OF THE INVENTION

In a manufacturing process of a solar cell or a flat panel display (FPD) such as a liquid crystal display (LCD), a specific process such as etching or film formation is performed on a large-size glass substrate. A multi-chamber type substrate processing system having a plurality of processing chambers is known as a substrate processing system for performing such a process (see, e.g., Japanese Patent Application Publication No. H5-196150).

The multi-chamber type substrate processing system includes a common transfer chamber having a transfer mechanism for transferring a substrate (processing target object). A processing chamber, a load lock chamber configured to exchange an unprocessed substrate and a processed substrate between the common transfer chamber and an atmospheric atmosphere, and the like are connected to the common transfer chamber. The common transfer chamber, the processing chamber and the load lock chamber are vacuum chambers, and the insides of these vacuum chambers can be set to be maintained in a depressurized state by being evacuated by a gas exhaust unit.

The vacuum chamber includes a hermetically sealed chamber main body, and the chamber main body is provided with an opening through which the target object is loaded and unloaded. The opening is opened and closed by using a gate valve. When the opening is closed by the gate valve, the inside of the chamber main body is hermetically sealed, and the inside of the chamber main body can be depressurized to a preset processing pressure or can be switched between a atmospheric state and a depressurized state. A configuration example of the gate valve is described in Japanese Patent Application Publication No. H5-196150.

In the gate valve described in Japanese Patent Application Publication No. H5-196150, a plate-shaped gate base moved up and down by a hydraulic cylinder is provided. Both lateral sides of a valve body and the gate base are rotatably connected by a link, whereby the valve body can be supported and pressed. In such a gate valve using the link mechanism, the valve body is separated apart from the peripheral surface around the opening when the link is inclined with respect to the valve body, while the valve body is pressed and firmly adhered to the peripheral surface around the opening when the link lies horizontally to the valve body.

Recently, with the scale-up of the target object or with the development of batch processing for processing a multiple number of processing target objects at a time, the size of the opening formed in the chamber main body for the loading and unloading of the target object has also increased. The size increase of the opening may lead to a size increase of the valve body, resulting in an increase of the weight of the valve body.

In the gate valve using the link mechanism as disclosed in Japanese Patent Application Publication No. H5-196150, if the weight of the valve body increases, it becomes difficult to support the valve body by the link. Furthermore, since the valve body is pressed from the lateral sides thereof, there is a concern that a pressure applied to an upper portion and a lower portion of the valve body may become insufficient if the size of the opening increases. Moreover, when a pressure in an opposite side to the valve body in a pressing direction is high (i.e., under a counter-pressure state), leakage may occur between the valve body and the peripheral surface around the opening if the link mechanism is slightly obliquely dislocated from the horizontally laid state, resulting in deterioration of airtightness.

These problems may become more obvious as the size of the opening, i.e., the size of the valve body increases. This is because the size increase of the valve body accompanies an increase of a pressure applied thereto under the counter-pressure state, an increase of a force counter-acting against the valve body and an increase of a bending amount of the valve body.

SUMMARY OF THE INVENTION

In view of the above, the present invention provides a gate valve hardly suffering deterioration of airtightness even if the size of a valve body increases. Further, the present invention also provides a substrate processing system using the gate valve.

In accordance with an aspect of the present invention, there is provided a gate valve including: a valve body to be pressed against a peripheral surface around opening through which a processing target object is loaded and unloaded; pressed members arranged on a surface of the valve body around the opening; a main slider which slides in a direction parallel to the peripheral surface around the opening; and pressing mechanisms, provided at the main slider, for pressing the respective pressed members.

Herein, each of the pressing mechanisms includes a cam having a protrusion for pressing the valve body against the peripheral surface around the opening and an inclined portion sloping downward from the protrusion; and the pressing mechanisms serve to press the valve body in a direction substantially perpendicular to the peripheral surface around the opening in a state that the valve body is positioned to face the opening, so that the valve body is pressed against the peripheral surface around the opening.

In accordance with another aspect of the present invention, there is provided a substrate processing system including: a processing chamber having an opening through which a processing target object is loaded and unloaded, for performing a process on the target object while maintaining the target object in a vacuum state; a load lock chamber having an opening through which the target object is loaded and unloaded, for performing an exchange of a processed target object and an unprocessed the target object while maintaining the target object in between an atmospheric state and a vacuum state; and a transfer chamber having an opening through which the target object is loaded and unloaded, for performing a transfer of the target object between the load lock chamber and the processing chamber.

Herein, the gate valve described above is used to open and close the opening of at least one of the processing chamber, the load lock chamber and the transfer chamber.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
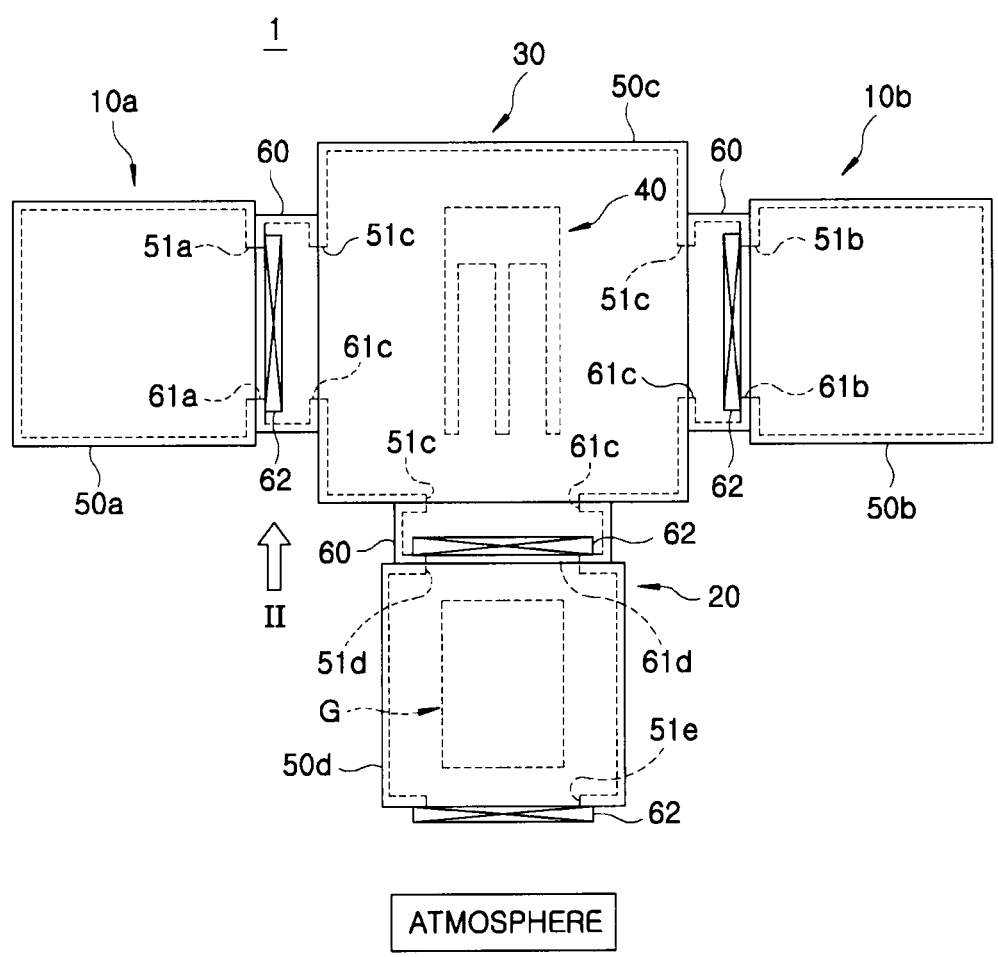
FIG. 1 is a plane view schematically illustrating an example of a substrate processing system using a gate valve in accordance with an embodiment of the present invention.

Hereinafter, embodiments of the present invention will be described with reference to the accompanying drawings which form a part hereof. Through the drawings, like reference numerals will be given to like parts.

In the following description, a large-size glass substrate for use in the manufacture of a solar cell or a FPD is used as an example of a processing target object, and a substrate processing system for performing a specific process such as etching or film formation on the glass substrate is explained.

FIG. 1 is a plane view schematically illustrating a substrate processing system using a gate valve in accordance with an embodiment of the present invention.

As illustrated in FIG. 1, a substrate processing system 1 in accordance with the present embodiment includes one or more processing chambers for performing a process on a substrate G, i.e., processing chambers 10a and 10b in the present embodiment; a load lock chamber 20 for performing an exchange of an unprocessed substrate G and a processed substrate G; a common transfer chamber 30 for performing a transfer of the substrate G between the load lock chamber 20 and the processing chamber 10a or 10b, and between the processing chamber 10a and the processing chamber 10b; and a transfer mechanism 40 provided in the common transfer chamber 30 and configured to transfer the substrate G.

In the present embodiment, the processing chambers 10a and 10b, the load lock chamber 20 and the common transfer chamber 30 are vacuum chambers, and they include hermetically sealed chamber main bodies 50a, 50b, 50d and 50c, respectively, each of which is configured to accommodate the substrate G therein in a depressurized state. The chamber main bodies 50a, 50b, 50c and 50d are provided with openings 51a, 51b, 51c and 51d through which the substrate G is loaded into and unloaded from the chamber main bodies 50a, 50b, 50c and 50d, respectively.

The openings 51a and 51b formed at the chamber main bodies 50a and 50b of the processing chambers 10a and 10b are connected to openings 51c formed at the chamber main body 50c of the common transfer chamber 30 through gate valve chambers 60. Likewise, the opening 51d formed at the chamber main body 50d of the load lock chamber 20 is connected to an opening 51c formed at the chamber main body 50c of the common transfer chamber 30 through the gate valve chambers 60.

In the present embodiment, the gate valve chambers 60 communicate with the openings 51a, 51b, 51c and 51d and are provided with openings 61a, 61b, 61c and 61d through which the substrate G is transferred. A valve body 62 of a gate valve is accommodated in each valve chamber 60. The openings 61a, 61b and 61d are opened and closed by the respective valve bodies 62. In the present embodiment, the valve bodies 62 are respectively closely adhered to the peripheral surfaces around the openings 61a and 61b on the side of the processing chambers and to the peripheral surface around the opening 61c on the side of the load lock chamber so as to hermetically seal the chamber main bodies 50a, 50b, 50c and 50d. However, the present embodiment is not limited thereto. For example, the valve bodies 62 may be closely adhered to the peripheral surfaces around the openings 61c on the side of the common transfer chamber 30, thus hermetically sealing the chamber main bodies 50a, 50b, 50c and 50d.

Further, the load lock chamber 20 is provided with an opening 51e opened to the atmosphere, i.e., to the outside of the substrate processing system 1. The opening 51e opened to the outside is used to load an unprocessed substrate G and unload a processed substrate G. The opening 51e is opened and closed by a valve body 62 that is maintained in the atmosphere.

Now, a gate valve in accordance with a first embodiment of the present invention will be described, and individual components of the gate valve will be elaborated.

Figure 2:
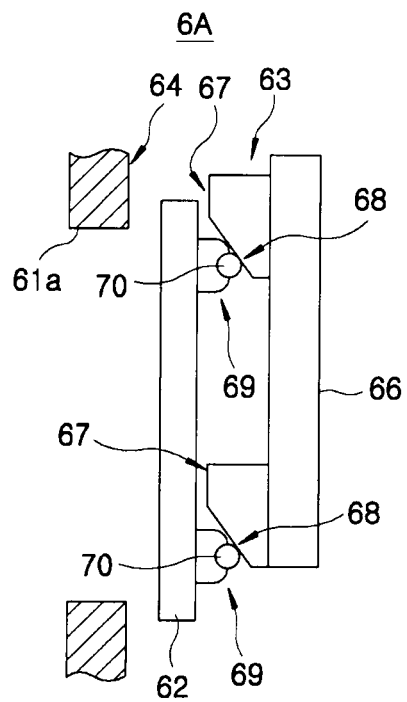
FIGS. 2 and 3 are side views each schematically illustrating an example of a pressing mechanism of a gate valve in accordance with a first embodiment of the present invention.
Figure 3:
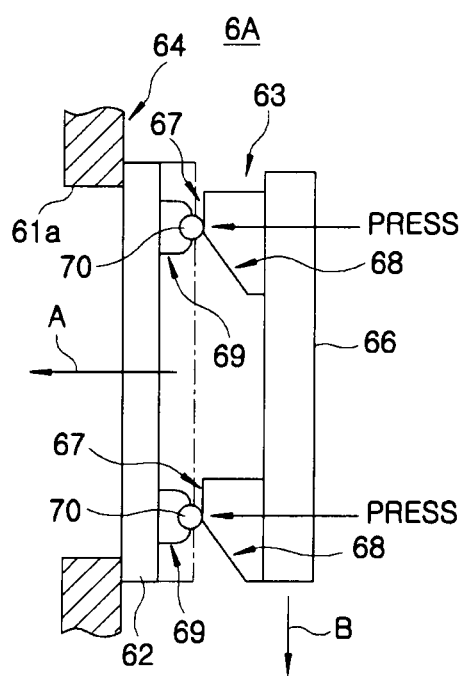

FIGS. 2 and 3 are side views schematically illustrating a valve body pressing mechanism of the gate valve in accordance with the first embodiment of the present invention. These side views are seen from a direction indicated by an arrow II shown in FIG. 1. There will be described as an example the gate valve provided between the processing chamber 10a and the common transfer chamber 30. FIG. 2 shows the valve body positioned to face the opening (i.e., a state where the valve body is released from pressing), and FIG. 3 shows a closed state of the gate valve (i.e., a state where the valve body is pressed).

As illustrated in FIGS. 2 and 3, a gate valve 6A in accordance with the present embodiment includes a valve body 62 to be pressed against a peripheral surface 64 around the opening 61a on the side of the processing chamber 10a through which a substrate G is loaded into or unloaded from the processing chamber 10a; and pressing mechanisms 63 configured to press the valve body 62 against the peripheral surface 64 around the opening 61a.

The pressing mechanisms 63 press the valve body 62 in a direction A perpendicular to the peripheral surface 64 around the opening 61a (see FIG. 3) while positioning it to face the opening 61a (see FIG. 2), thus allowing the valve body 62 to be pressed against the peripheral surface 64 around the opening 61a.

The gate valve 6A includes a main slider 66 configured to slide in a direction B parallel to the peripheral surface 64, i.e., configured to move up and down in the present embodiment. The pressing mechanisms 63 are provided at the main slider 66. Each pressing mechanism 63 includes a cam having a protrusion 67 configured to press the valve body 62 against the peripheral surface 64 around the opening 61*a*; and an inclined portion 68 sloping down from the protrusion 67.

The valve body 62 is provided with pressed members 69 pressed by the pressing mechanisms 63. Each pressed member 69 has a roller 70 configured to be in contact with the pressing mechanism 63. The roller 70 rolls on the surfaces of the protrusion 67 and the inclined portion 68 as the pressing mechanism 63 slides, i.e., moves up and down in the present embodiment.

When the roller 70 is in contact with the inclined portion 68, the valve body 62 is kept away from the opening 61*a*, as illustrated in FIG. 2. When the roller 70 is in contact with the protrusion 67, on the other hand, the protrusion 67 presses the roller 70 in the direction A, whereby the valve body 62 is pressed against the peripheral surface 64 around the opening 61*a*, as illustrated in FIG. 3. Further, a sealing member (not shown), e.g., an O-ring is provided around the opening 61*a* so as to improve airtightness.

Figure 9A:
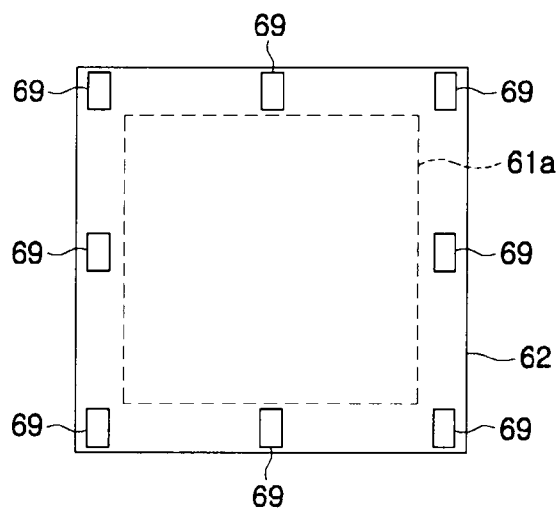
FIGS. 9A to 9C illustrate examples of a layout of pressing members.

Referring to FIG. 9A, the pressed members 69 are arranged at positions on a surface of the valve body 62 along the periphery of the opening 61*a*. With this configuration, it is possible to press upper and lower portions of the valve body 62 as well as lateral portions thereof.

Now, a separation mechanism (valve body return mechanism) and a support and guide mechanism (pressing mechanism for pressing the valve body in the perpendicular direction thereto) of the valve body 62 will be described.

A gate valve using a link mechanism employs a tensile spring as a valve body separation mechanism, i.e., as a mechanism for returning the valve body from a closed state (pressed state) to an open state (released from pressing). That is, when the gate valve is in the closed state, the tensile spring is extended so that the valve body is biased by the tensile spring toward a base. When the gate valve is opened, the tensile spring is contracted to return the valve body back to the base.

In this way, the tensile spring has been conventionally used as the separation mechanism of the valve body. However, the tensile spring is in a state that the tensile force is being continuously generated while the gate valve is in the closed state. Accordingly, it may be possible that the tensile spring is degraded and finally cut off.

In view of the foregoing problem, a gate valve in accordance with a second embodiment of the present invention is designed as follows.

Figure 4:
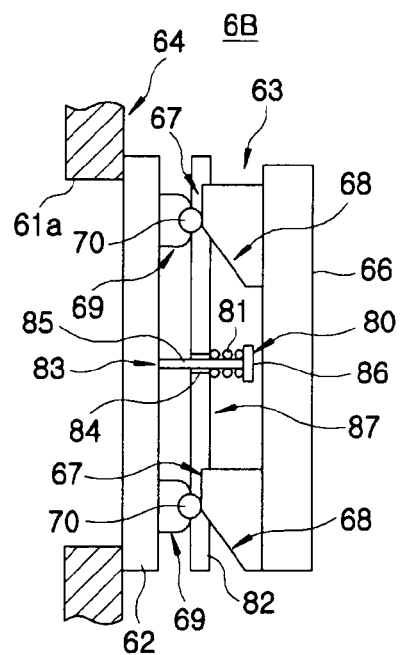
FIGS. 4 and 5 are side views each schematically illustrating an example of a separation member of a gate valve in accordance with a second embodiment of the present invention.
Figure 5:
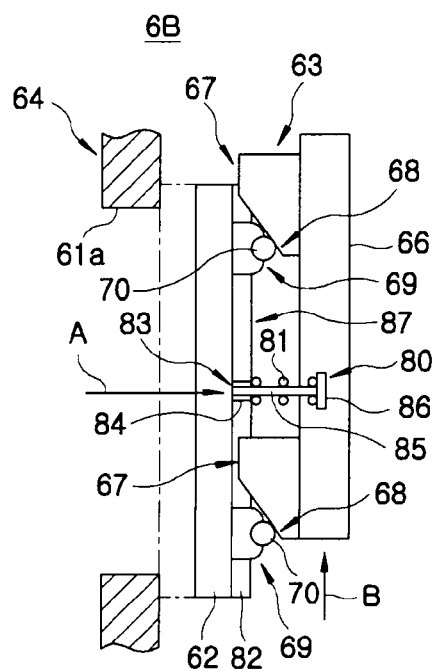

FIGS. 4 and 5 are side views schematically illustrating an example of a valve body return mechanism of the gate valve in accordance with the second embodiment of the present invention. Similar to FIGS. 2 and 3, these side views are also seen from a direction indicated by the arrow II shown in FIG. 1. Further, FIG. 4 shows a closed state of the gate valve, and FIG. 5 shows a valve body positioned to face the opening (i.e., a state where the valve body is released from pressing).

As illustrated in FIGS. 4 and 5, a gate valve 6B of the present embodiment additionally includes a separation mechanism 80 configured to move the valve body 62 away from the opening 61*a*, as compared to the gate valve 6A shown in FIGS. 2 and 3. The separation mechanism 80 includes an extensible/contractible body 81, e.g., a compression spring, configured to be contracted when the valve body 62 is closed.

When the valve body 62 is pressed against the peripheral surface 64 around the opening 61*a*, the extensible/contractible body 81 is contracted as shown in FIG. 4. When the valve body 62 is separated from the peripheral surface 64 around the opening 61*a*, on the other hand, the extensible/contractible valve body 61 is extended, thus allowing the valve body 62 to be moved away from the opening 61*a*, as shown in FIG. 5.

For example, the gate valve 6B includes a sub-slider 82 provided between the valve body 62 and the main slider 66 and configured to slide in a direction B parallel to the peripheral surface 64 around the opening 61*a*. The separation mechanism 80 is provided at the sub-slider 82.

The sub-slider 82 is provided with a support and guide mechanism 83 configured to support the valve body 62 and to define a pressing direction and a separation direction of the valve body 62 to a direction A perpendicular to the peripheral surface 64. For instance, the support and guide mechanism 83 may include a guide opening 84 formed in the sub-slider 82 along the direction A; and a shaft 85 inserted through the guide opening 84 and fixed to the valve body 62. Since the shaft 85 is moved forward and backward through the guide opening 84, a movement direction of the valve body 62 can be defined to the direction A.

Further, a flange 86 is provided at a leading end of the shaft 85 opposite to the valve body 62. In the present embodiment, the extensible/contractible body 81 is positioned between a facing surface 87 of the sub-slider 82 facing the main slider 66 and the flange 86 provided in a direction parallel to the facing surface 87.

When the valve body 62 is pressed against the peripheral surface 64 around the opening 61*a*, the flange 86 compresses the extensible/contractible body 81, as shown in FIG. 4. When the valve body 62 is separated from the peripheral surface 64 around the opening 61*a*, on the other hand, an extension force is applied to the flange 86 from the contracted extensible/contractible body 81 to move the valve body 62 away from the opening 61*a*, as shown in FIG. 5.

Further, it may be preferable that the flange 86 of the separation mechanism 80 does not come into contact with the main slider 66 when the extensible/contractible body 81 is extended. In the present embodiment, an opening (not shown) is formed in the main slider 66, so that the flange 86 can be prevented from coming into contact with the main slider 66 when the extensible/contractible body 81 is extended.

Moreover, although the separation member 80 is fixed to the support and guide mechanism 83 in the present embodiment, the support and guide mechanism 83 and the separation mechanism 80 may be provided separately.

Hereinafter, an overall configuration of the valve body 62 including a retreating mechanism and an operation of the valve body 62 will be described in detail.

After the valve body 62 is separated from the peripheral surface 64 around the opening 61*a*, the valve body 62 is retreated from a position at the front of the opening 61*a* to allow a substrate G to be loaded or unloaded through the opening 61*a*. For example, the valve body 62 may be retreated upward, downward, to the left or to the right of the opening 61*a*. In the present embodiment, the valve body 62 is retreated to above the opening 61*a*.

Figure 6:
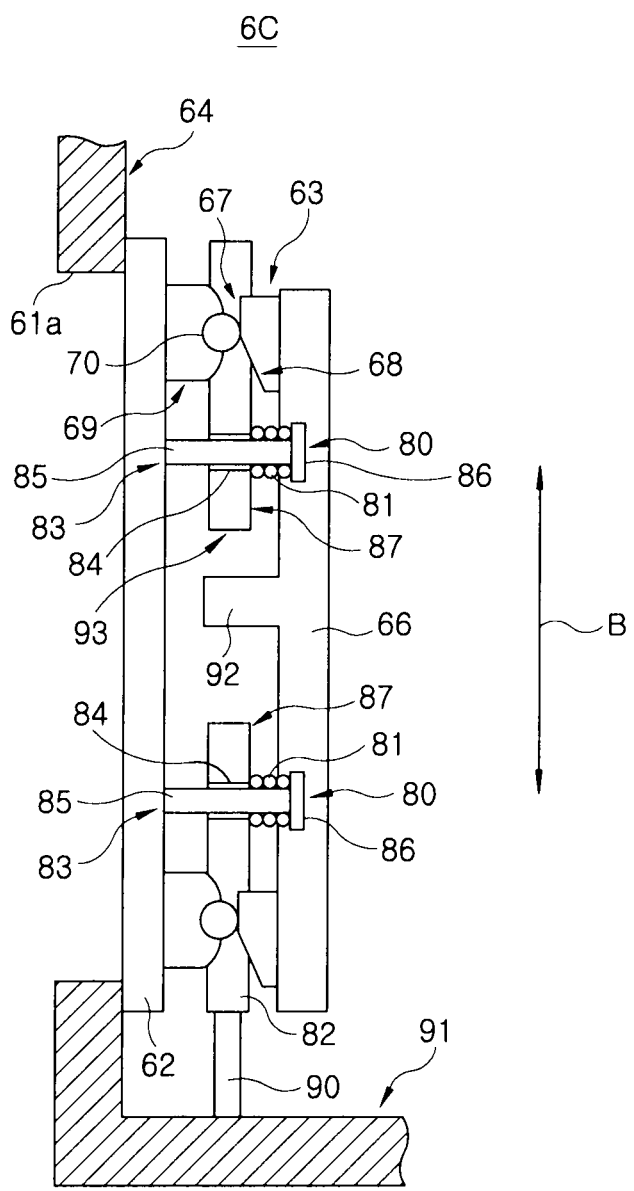
FIGS. 6 to 8 are side views each schematically illustrating an example of a gate valve in accordance with a third embodiment of the present invention.
Figure 7:
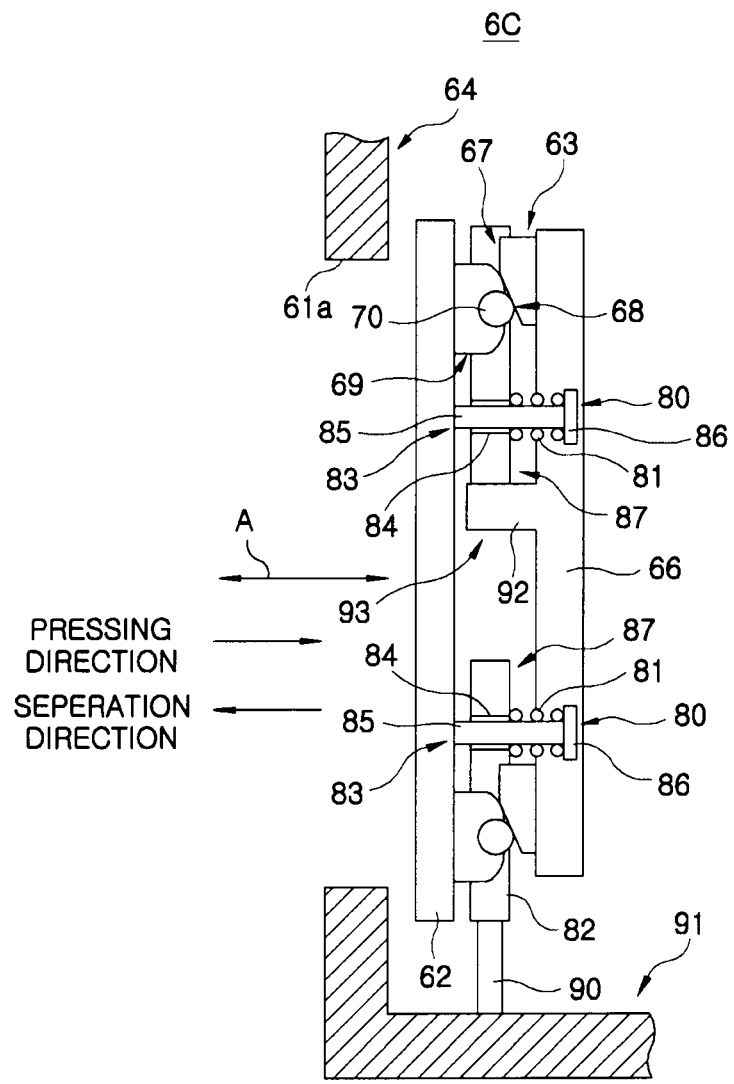
Figure 8:
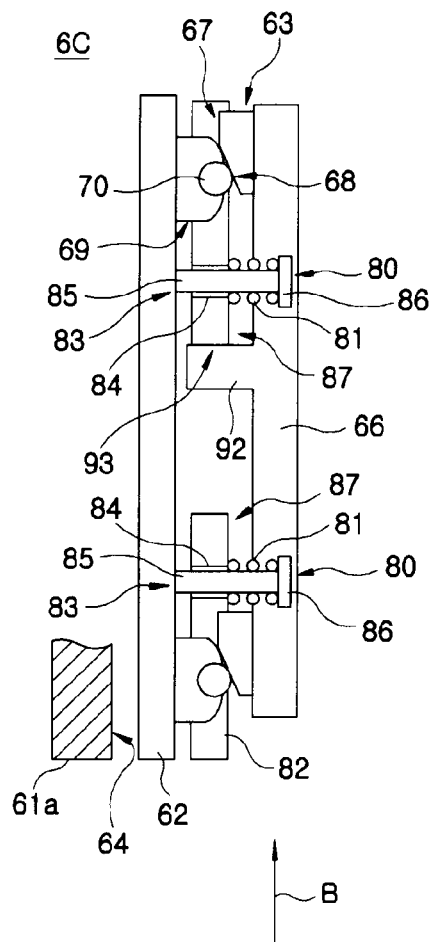
Figure 8:
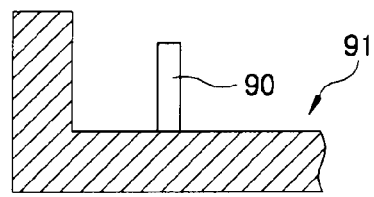
Figure 10:
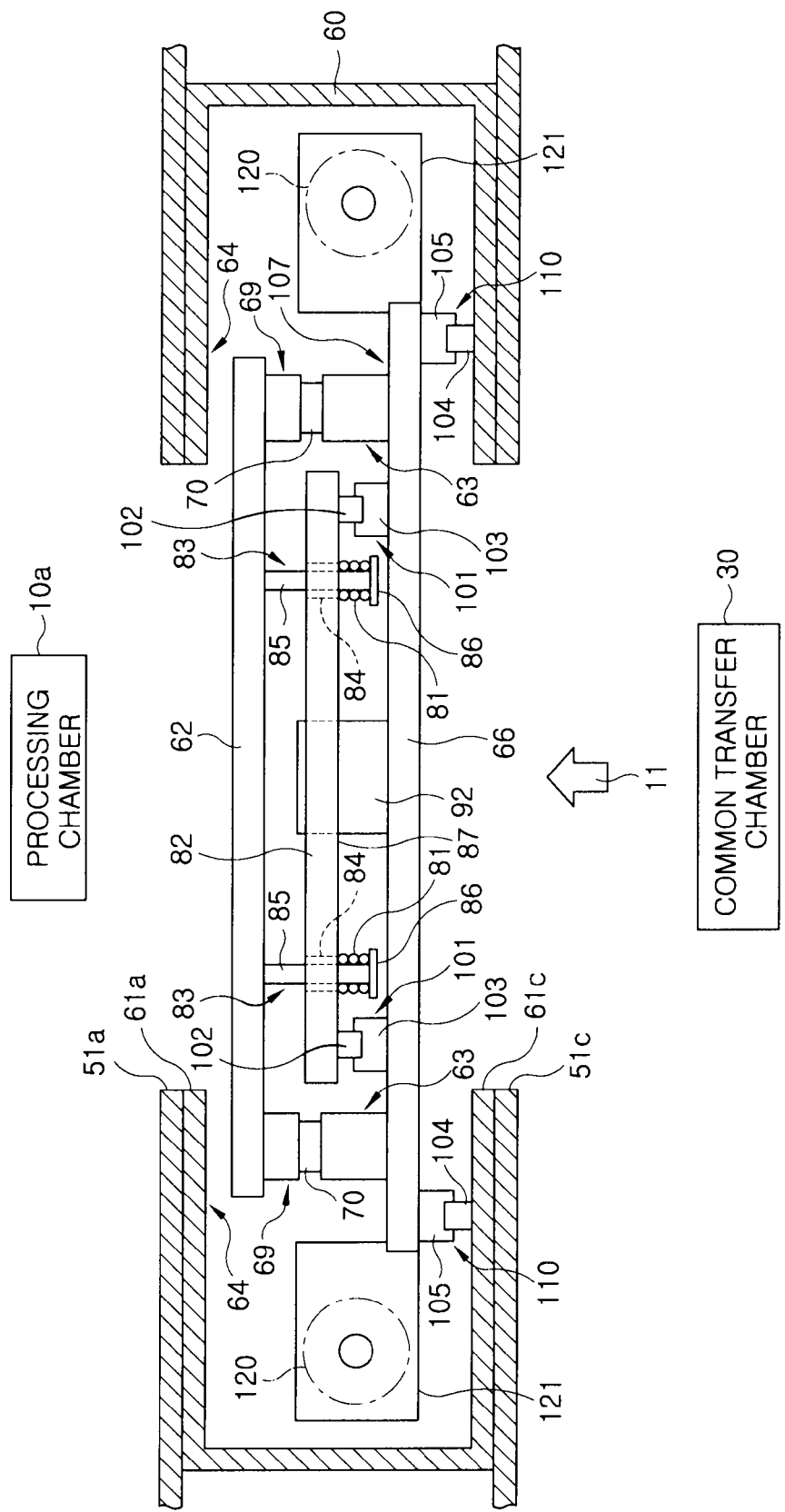
FIG. 10 is a plane view schematically illustrating an example of a gate valve in accordance with the third embodiment of the present invention.
Figure 11:
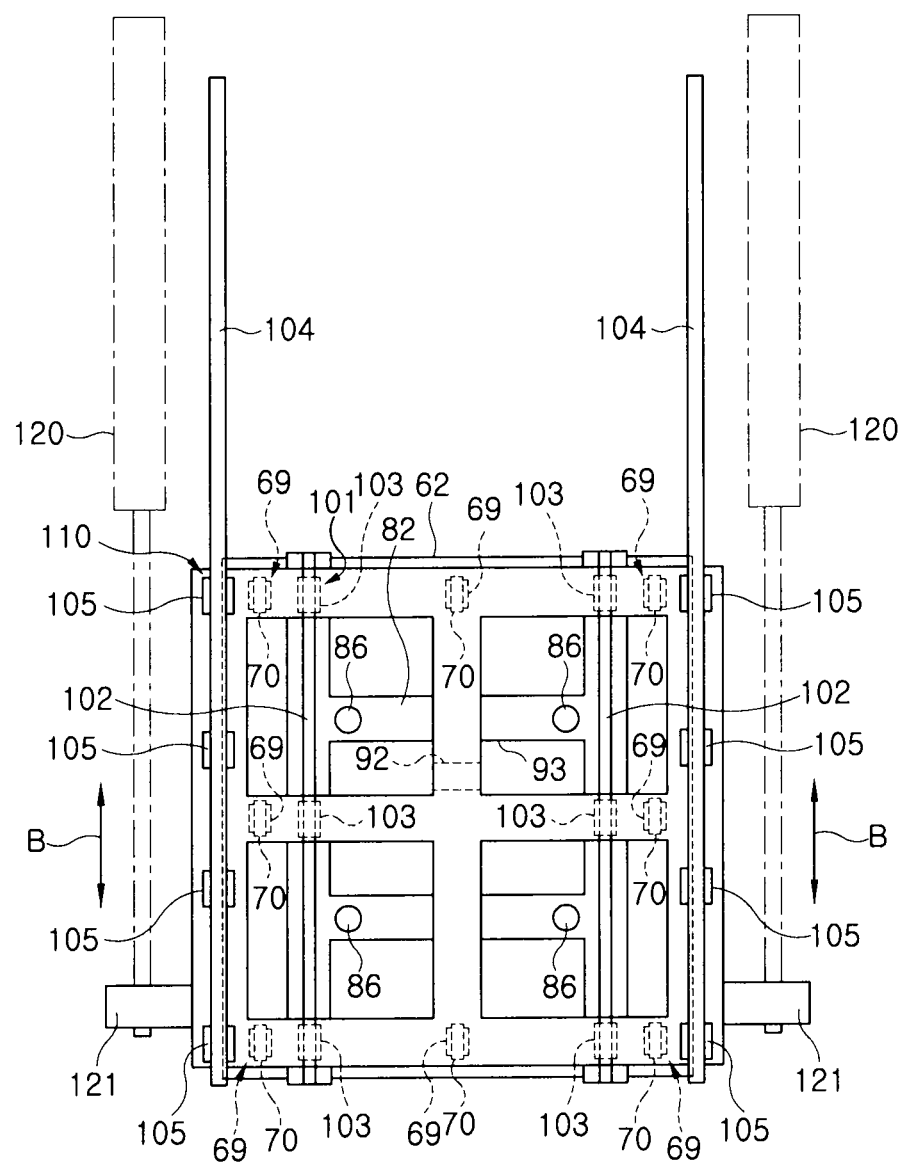
FIG. 11 is a front view when seen from a direction of an arrow 11 of FIG. 10.

FIGS. 6 to 8 are side views schematically illustrating an example of a gate valve in accordance with a third embodiment of the present invention. Similar to FIGS. 2 and 3, these side views are also seen from a direction indicated by the arrow II shown in FIG. 1. Further, FIG. 6 shows a closed state of the gate valve; FIG. 7 shows a valve body positioned to face the opening (i.e., a state where the valve body is released from pressing); and FIG. 8 shows an open state of the gate valve (i.e., a state where the valve body is retreated upward). Further, FIG. 10 is a plane view schematically illustrating the gate valve in accordance with the third embodiment, and FIG. 11 is a front view when seen from a direction indicated by an arrow 11 shown in FIG. 10 (i.e., a direction from the common transfer chamber 30 toward the processing chamber 10a). In FIG. 10, among the pressed members 69, those positioned at the center of an upper part and a lower part of the valve body 62 and the corresponding pressing mechanisms 63 thereto are not shown.

As illustrated in FIGS. 6 to 8, a gate valve 6C in accordance with the third embodiment has a stopper 90 configured to stop the sliding of a sub-slider 82 in a direction B parallel to the peripheral surface 64 around the opening 61a. The stopper 90 is provided at, for example, a bottom wall 91 of each of the gate valve chambers 60.

In the gate valve 6C illustrated in FIGS. 6 to 8, the main slider 66 has an engagement member 92 to be engaged with the sub-slider 82. The engagement member 92 is, for example, a protrusion, and the protrusion is positioned within an opening 93 formed in the sub-slider 82.

Furthermore, as illustrated in FIGS. 10 and 11, the main slider 66 has a vertical guide mechanism 101 provided on a facing surface 107 of the main slider 66 that faces the sub-slider 82 and configured to make the main slider 66 slide, i.e., move up and down in the present embodiment, with respect to the sub-slider 82. The sub-slider 82 and the main slider 66 are connected via the vertical guide mechanisms 101. In FIGS. 6 to 8, illustration of the vertical guide mechanism 101 is omitted. For example, the vertical guide mechanism 101 may include guide rails 102 provided on a facing surface 87 of the sub-slider 82 facing the main slider 66 and extended in a direction B parallel to the peripheral surface 64; and connection members 103 fixed on the facing surface 107. The main slider 66 can slide with respect to the sub-slider 82 while it is connected with the sub-slider 82 via the guide rails 102 and the connection members 103.

Further, the gate valve 6C also includes another vertical guide mechanism 110 configured to slide the main slider 66, i.e., to move the main slider 66 up and down in the present embodiment, as shown in FIGS. 10 and 11. In FIGS. 6 to 8, illustration of the vertical guide mechanism 110 is also omitted. The vertical guide mechanism 110 moves the main slider 66 up and down along the direction B parallel to the peripheral surface 64 around the opening 61a. The vertical guide mechanism 110 may have the similar configuration as that of the vertical guide mechanism 101. That is, as illustrated in FIGS. 10 and 11, the vertical guide mechanism 110 may include guide rails 104 on an inner wall of the gate valve chamber 60 extending in the direction B parallel to the peripheral surface 64; and connection members 105 fixed to the main slider 66. Further, the vertical guide mechanisms 101 and 110 can also be applied to the first and the second embodiment.

Moreover, as shown in FIGS. 10 and 11, the gate valve 6C has driving mechanisms 120 configured to drive the main slider 66, i.e., to move the main slider 66 up and down in the present embodiment. Each of the driving mechanisms 120 may be implemented by, e.g., an air cylinder or a hydraulic cylinder. The driving mechanisms 120 are connected with the main slider via joints 121. The main slider 66 is moved up and down by the driving mechanisms 120 while the main slider 66 is guided by the vertical guide mechanism 110 along the direction B. In FIGS. 6 to 8, illustration of the driving mechanisms 120 and the joints 121 is omitted.

Hereinafter, an operation of the gate valve in accordance with the embodiments of the present invention will be explained in detail with reference to FIGS. 6 to 8.

As shown in FIG. 8, when the gate valve 6C is opened (i.e., the valve body 62 is retreated from the position at the front of the opening 61a), the sub-slider 82 is held by the engagement member 92 provided at the main slider 66. Further, the valve body 62 is also held by the support and guide mechanisms 83 provided at the sub-slider 82, as described above. While supporting the sub-slider 82, the main slider 66 is moved downward in the direction B parallel to the peripheral surface 64 by the driving mechanisms 120 and the vertical guide mechanism 110 provided at the main slider 66.

As shown in FIG. 7, if the main slider 66 is moved down to a position where the valve body 62 is positioned to face the opening 61a, the descent of the sub-slider 82 is stopped by the stopper 90, and the valve body 62 is also stopped. After the descent of the sub-slider 82 is stopped, only the main slider 66 is further moved down by the vertical guide mechanism 101. As a result, the rollers 70 of the pressed members 69 roll onto the protrusions 67 from the inclined portions 68, so that the pressing mechanisms 63 press the valve body 62 against the peripheral surface 64 around the opening 61a. At this time, the support and guide mechanisms 83 allows the valve body 62 to be pressed along the direction A perpendicular to the peripheral surface 64, so that the gate valve can be closed without the valve body 62 being misaligned with the peripheral surface 64 (see FIG. 6).

Then, to open the gate valve (see FIG. 8) in this state, the main slider 66 is first moved up by the driving mechanisms 120. If the main slider 66 is moved up, the rollers 70 roll onto the inclined portions 68 from the protrusions 67, and the extensible/contractible bodies 81 pull the valve body 62 along the direction A perpendicular to the peripheral surface 64, as illustrated in FIG. 7. As a result, the valve body 62 is pulled toward the sub-slider 82 and thus separated from the opening 61a.

If the main slider 66 is further moved up, the engagement member 92 comes into contact with the edge of the opening 93 of the sub-slider 82, as shown in FIG. 7. If the main slider 66 is continuously moved up, the engagement member 92 is engaged with the opening 93 of the sub-slider 82 stopped by the stopper 82, so that the sub-slider 82 and the valve body 62 are moved upward together. As a result, the valve body 62 is retreated from the position at the front of the opening 61a, i.e., retreated upward from the opening 61a, as illustrated in FIG. 8, and the substrate G can be loaded or unloaded through the opening 61a.

As can be clearly seen from the above description, in the gate valve in accordance with the embodiments of the present invention, the pressing mechanisms 63 provided at the main slider 66 are capable of pressing the valve body 62 in the direction A perpendicular to the peripheral surface 64 in the state that the valve body 62 is positioned to face the opening 61a, thus allowing the valve body 62 to be uniformly pressed against the peripheral surface 64 around the opening 61a.

Further, the main slider 66 is connected to the inner wall of the gate valve chamber 60 via the guide mechanism 110 and kept by the inner wall of the gate valve chamber 60 from moving in the direction A perpendicular to the peripheral surface 64. Accordingly, the pressing mechanisms 63 are allowed to keep on pressing the pressed members 69 of the valve body 62 along the direction A even in case that a counter-pressure is applied to the valve body 62 when a process is performed in the processing chamber 10a at a pressure higher than that of the common transfer chamber 30 or when the processing chamber 10a is detached for maintenance, for example. Further, the pressing mechanisms 63 only make sliding movements, i.e., only move up and down in the present embodiment, without moving sidewise. That is, the pressing mechanisms 63 are not moved sidewise even in case a counter-pressure is applied thereto and only keep on pressing the pressed members 69 uniformly in the direction A.

Accordingly, when a counter-pressure is applied to the valve body 62, especially, when the size of the valve body 62 is large and a counter pressing force applied to the valve body 62 is great, the valve body 62 can be prevented from being separated from the peripheral surface 64 around the opening 61a of the valve body 62. Thus, it is possible to achieve a gate valve hardly suffering deterioration of airtightness even in case the size of the valve body increases. Further, a substrate processing system using such gate valve can also be achieved.

In comparison, in a gate valve as described in Japanese Patent Application Publication No. H5-196150, a hydraulic cylinder needs to be operated continuously in order to maintain a closed state of the gate valve. Since, however, the pressing mechanisms 63 of the gate valve in accordance with the embodiments of the present invention are configured to press the valve body 62 by the cams, an additional driving force is not required to maintain the closed state of the gate valve. Accordingly, even when a supply of air or power for driving is stopped for, e.g., maintenance, the closed state of the gate valve can be still maintained.

Further, in a gate valve using a link mechanism, a valve body is supported by links provided at both lateral sides of the valve body. If the weight of the valve body increases, however, the links may not bear the weight of the valve body, resulting in deformation of the links. In the gate valve in accordance with the embodiments of the present invention, the valve body 62 is held by the support and guide mechanism 83 provided at the sub-slider 82, and the support and guide mechanism 83 can be provided at any position on the sub-slider 82. For example, the support and guide mechanism 83 may be provided at a central portion of the sub-slider 82, and a multiple number of support and guide mechanisms 83 may be provided. Similarly, the engagement member 92 provided at the main slider 66 to support the sub-slider 82 may be located at any position on the main slider 66 as long as it is located at a position corresponding to the opening 93. Thus, even if the size and the weight of the valve body 62 increase, the valve body 62 can be still supported effectively. That is, it is possible to cope with the scale-up of the valve body 62 successfully.

Moreover, by providing the support and guide mechanisms 83 at the sub-slider 82, the valve body 62 can be firmly pressed against the peripheral surface 64 exactly in a direction perpendicular to the peripheral surface 64. Further, since the sub-slider 82 is connected with the main slider 66 via the vertical guide mechanism 101, the sub-slider 82 is prevented from being obliquely dislocated from the peripheral surface 64. With these configurations, a gate valve without suffering degradation of airtightness and a substrate processing system using such gate valve can be achieved.

Further, in the gate valve in accordance with the embodiments of the present invention, the extensible/contractible body 81 featuring a stable extension state is used in the separation mechanism 80, and a compressive force can be applied to the extensible/contractible body 81 when the gate valve is in the closed state. Thus, as compared to a conventional case that a tensile force is always applied to the extensible/contractible body when the gate valve is in the closed state, a cut-off of the extensible/contractible body can be avoided. Therefore, it is possible to achieve a gate valve capable of resolving a problem that the extensible/contractible body is cut off during the processing of the substrate so that the valve body 62 cannot be separated from the peripheral surface 64 around the opening 61a. Moreover, a substrate processing system using such gate valve can also be achieved.

Figure 12A:
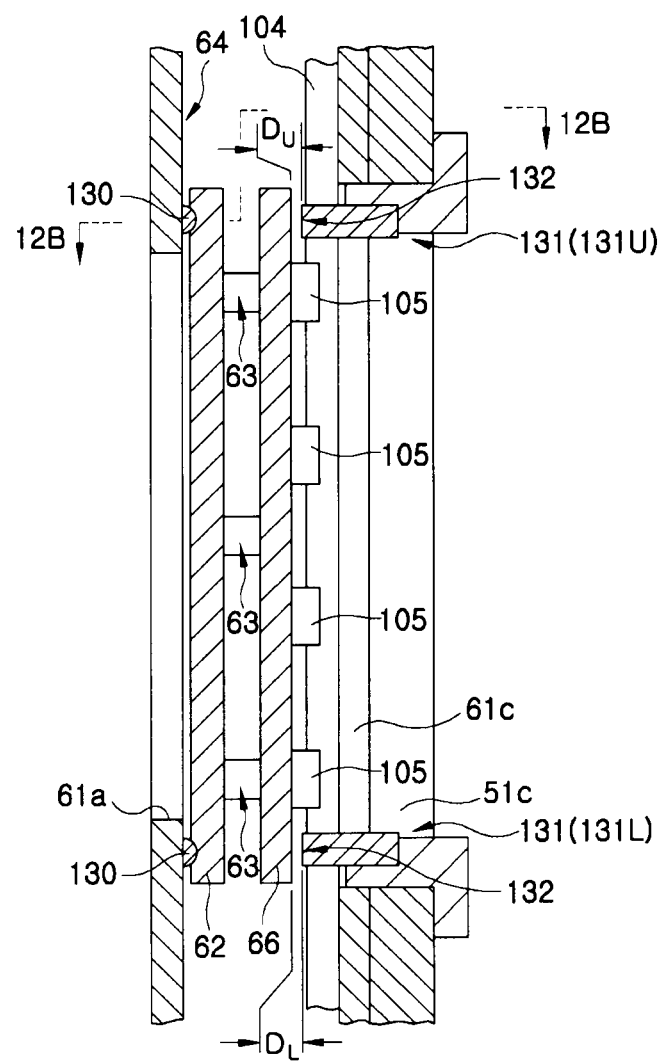
FIGS. 12A and 12B are cross sectional views illustrating a gate valve in accordance with a fourth embodiment of the present invention.
Figure 12B:
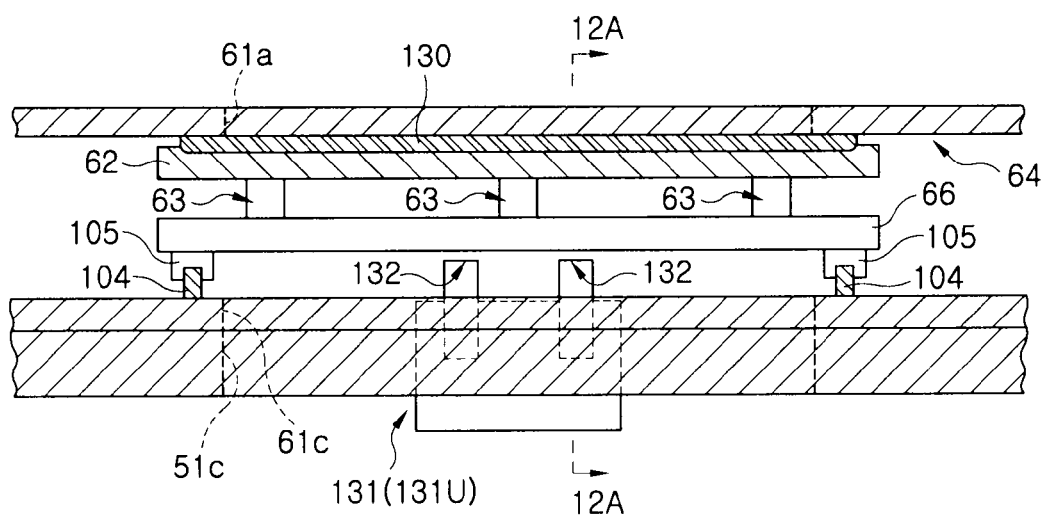

FIGS. 12A and 12B are cross sectional views showing a gate valve in accordance with a fourth embodiment of the present invention. FIG. 12A is a longitudinal cross sectional view taken along a line 12A-12A shown in FIG. 12B, and FIG. 12B is a transversal cross sectional view taken along a line 12B-12B shown in FIG. 12A. Further, although a sub-slider 82 is omitted in the present embodiment illustrated in FIGS. 12A and 12B, this embodiment is also applicable to a case in which the sub-slider 82 is provided.

In general, sealing members 130 are attached to a peripheral portion of the valve body 62 that is pressed against the peripheral surface 64 by the pressing mechanisms 63, as illustrated in FIGS. 12A and 12B. As the sealing members 130 are pressed against the peripheral surface 64, the opening 61a is sealed. An example of the sealing member 130 is an O-ring. During a process, a counter-pressure may be applied to the valve body 62 through the opening 61a. Against such a counter-pressure, the sealing members 130 are firmly pressed and adhered to the peripheral surface 64 by the strength of the valve body 62 itself and a pressing force applied by the pressing mechanisms 63 of the main slider 66, so that airtightness can be maintained.

Further, in the gate valve in accordance with the first to third embodiments of the present invention, the guide rails 104 are provided on the rear side of the main slider 66, and the connection members 105 fixed to the main slider 66 are slidably connected to the guide rails 104. The guide rails 104 are arranged along the lateral portions of the opening 61a. With this configuration, when a counter-pressure is applied to the main slider 66 from the valve body 62, the guide rails 104 serves to confine elastic deformation of the main slider 66, which may occur along the lateral portions of the opening 61a by the counter-pressure from the main slider 66.

Meanwhile, the above-described gate valve in accordance with the first to third embodiments of the present invention has a configuration suitable for scale-up. For example, the gate valve in accordance with the first to third embodiments of the present invention is applicable for an opening 61a having a meter-order size, i.e., a size of several meters long and several meters wide. In case that the opening 61a has the meter-order size, the valve body 62 also has the meter-order size.

If the size of the valve body 62 is great, a counter pressing force applied thereto becomes also great. The valve body 62 to which the great counter-pressure is applied applies a stress to the main slider 66 along an upper portion and a lower portion of the opening 61a, which causes deformation of the main slider 66. As a result, the main slider 66 may suffer elastic deformation.

Even if the valve body 62 is deformed just slightly due to the counter-pressure, deformation at a central upper portion and a central lower portion of the opening 61a may be very great in case that the valve body 62 has, e.g., the meter-order size.

In the gate valve in accordance with the first to third embodiments of the present invention, however, no component such as the guide rails 104 serving to confine the elastic deformation of the main slider 66 generated by the counter-pressure is provided at portions corresponding to the upper and lower portions of the opening 61a.

If the portions of the valve body 62 corresponding to the central upper portion and the central lower portion of the opening 61a are deformed over a sealing maintaining range of the sealing members 130, the sealing members 130 are spaced apart from the peripheral surface 64 around the opening 61a, resulting in deterioration of airtightness.

In view of the foregoing problem, in the fourth embodiment, screen members 131 for confining elastic deformation of the main slider 66 are provided at positions corresponding to the upper central portion of the opening 61a and the lower central portion of the opening 61a on a side of the main slider 66 opposite to a side thereof facing the valve body 62. In the present embodiment, the screen members 131 are provided at an upper central portion and a lower central portion of each of the openings 51c and 61c close to the common transfer chamber 30. Further, in the present embodiment, the screen members 131 are fixed to the wall of the common transfer chamber 30. Although the screen members 131 are separable, by means of bolts for example, they are firmly held in place once fixed to the wall of the common transfer chamber 30.

As stated above, by providing the screen members 131 at the positions corresponding to the upper central portion and the lower central portion of the opening 61a, elastic deformation of the main slider 66 is confined by the screen members 131 even when a counter-pressure from the valve body is applied to the main slider 66. Since the elastic deformation of the main slider 66 is confined, deformation of the portions of the valve body 62 corresponding to the upper central and the lower central portion of the opening 61a can be stopped. For example, if a distance between the main slider 66 and a front end portion 132 of each screen member 131 is set to be lower than the sealing maintaining range of the sealing member 130, it is possible to suppress the portions of the valve body 62 corresponding to the upper central and the lower central portion of the opening 61a from being deformed beyond the sealing maintaining range of the sealing member 130. To elaborate, example design values are as follows, though the values may be varied depending on the size of the valve body 62 or the level of the estimated counter-pressure.

(When the valve body 62 blocks the chamber main body 50a (50b) of the processing chamber 10a (10b))

Distance $D_L$ between the front end portion 132 of the lower screen member 131L and the main slider 66: about 0.3 mm$\leq D_L \leq$about 0.35 mm Distance $D_U$ between the front end portion 132 of the upper screen member 131U and the main slider 66: about 0.5 mm$\leq D_L \leq$about 0.55 mm (When the valve body 62 blocks the chamber main body 50d of the load lock chamber 20)

Distance $D_L$ between the front end portion 132 of the lower screen member 131L and the main slider 66: about 0.4 mm$\leq D_L \leq$about 0.45 mm Distance $D_U$ between the front end portion 132 of the upper screen member 131L and the main slider 66: about 0.6 mm$\leq D_L \leq$about 0.65 mm A lower limit of the range of these distance values is determined in consideration of a risk of, e.g., contact with components members of the valve during their operation, while an upper limit is determined in consideration of an allowance limit for the maintenance of airtightness against a counter-pressure.

The fourth embodiment described above is particularly advantageous when the vale body 62 has the meter-order size, or when the estimated counter-pressure is great, for example.

The above-described embodiments are illustrative in all aspects, and the present invention may be variously modified without being limited to the above-described embodiments.

For example, in the above-described embodiments, the pressed members 69 pressed by the pressing mechanisms 63 of the valve body 62 may be provided at any positions of the valve body 62. For example, when a link mechanism is used, links are provided at both lateral sides of the valve body to press the valve body 62. However, when the pressed members 69 are used, the pressed members 69 may be arranged at an upper portion and a lower portion of the valve body 62 as well as lateral portions thereof. Thus, as illustrated in FIG. 9A, it is possible to press the upper portion and the lower portion of the valve body as well as lateral portions thereof.

Furthermore, the pressed members 69 may be arranged in an area of the valve body 62 corresponding to the opening 61a to which a greatest pressure is applied. Therefore, the pressed members 69 may be arranged along the inner side of the opening 61a as shown in FIG. 9B.

Figure 9B:
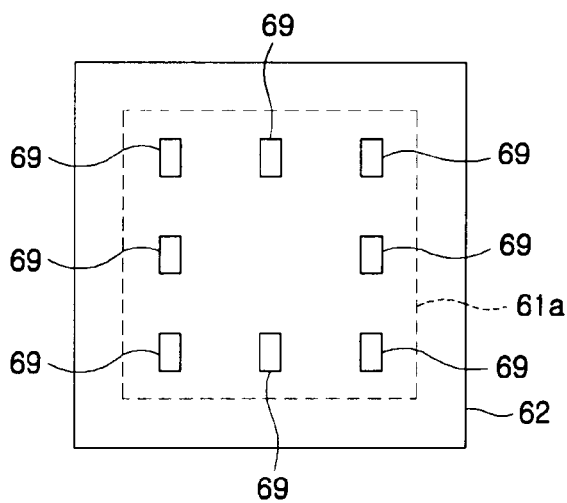
Figure 9C:
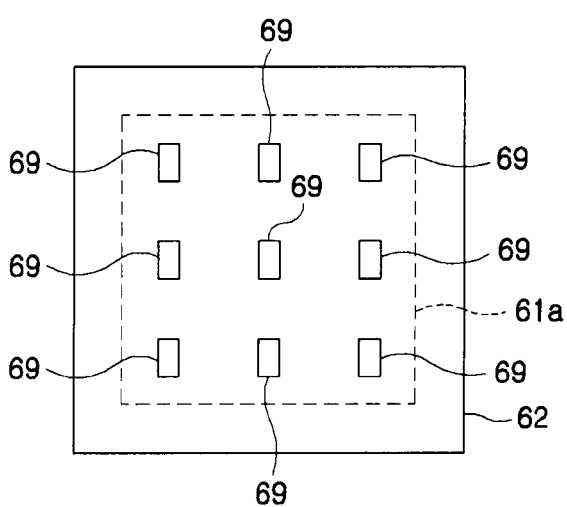

Moreover, as shown in FIG. 9C, a central pressed member 69 may be further provided at a central portion of the valve body 62 corresponding to a central portion of the opening 61a in addition to the arrangement shown in FIG. 9B.

As stated above, by arranging the pressed members 69 at the portions of the valve body 62 corresponding to the inner side of the opening 61a, the valve body 62 can be pressed against to prevent deformation of the valve body 62 due to a counter-pressure applied thereto. Thus, even if the size of the valve body increases, a gate valve hardly suffering deterioration of airtightness can be achieved.

Such effect can be enhanced by arranging the pressed members at the portions of the valve body 62 along the inner side of the opening 61a and further by arranging the central pressed member at the central portion of the valve body 62 corresponding to the central portion of the opening 61a.

In FIGS. 9A to 9C, although eight or nine pressed members 69 are provided around the opening 61a by arranging three pressed members 69 at each side of the valve body 62 or by adding one more central pressed member to the eight pressed members, the present invention is not limited thereto. For example, twelve or thirteen pressed members may be provided by arranging four pressed members 69 at each side of the valve body 62 or by adding one more central pressed member to the twelve pressed members. Still, more than 13 pressed members may be provided. In any case, it may be preferable to equi-space the pressed members 69 provided at each side of the valve body 62 so as to press the valve body 62 uniformly.

Further, in the above-described embodiments, although the valve body, the sub-slider and the main slider are moved up and down, they may be configured to be moved in left and right directions.

Moreover, in the above-described embodiments, each of the pressing mechanism 63 includes the cam having the protrusion 67 and the inclined portion 68, and each of the pressed members 69 is implemented by the roller 70 to be brought into contact with the cam. However, the pressing mechanism may be a roller, while the pressed member may be made up of a cam including a protrusion and an inclined portion.

Furthermore, in the above-described embodiments, although the processing target object is a glass substrate for use in the manufacture of a solar cell or a FPD, the target object is not limited to the glass substrate. For example, it may be a semiconductor wafer or the like.

While the invention has been shown and described with respect to the embodiments, it will be understood by those skilled in the art that various changes and modification may be made without departing from the scope of the invention as defined in the following claims.

What is claimed is:

1. A gate valve comprising:
   a valve body to be pressed against a peripheral surface around opening through which a processing target object is loaded and unloaded;
   pressed members arranged on a surface of the valve body;
   a main slider which slides in a direction parallel to the peripheral surface around the opening; and
   pressing mechanisms, provided at the main slider, for pressing the respective pressed members, wherein each of the pressing mechanisms includes a cam having a protrusion for pressing the valve body against the peripheral surface around the opening and an inclined portion sloping downward from the protrusion;

wherein the pressing mechanisms serve to press the valve body in a direction substantially perpendicular to the peripheral surface around the opening in a state that the valve body is positioned to face the opening, so that the valve body is pressed against the peripheral surface around the opening;

wherein the gate valve further comprises a sub-slider provided between the valve body and the main slider to support the valve body;

wherein the sub-slider is slidable in a direction substantially parallel to the peripheral surface around the opening;

wherein the sub-slider includes a support and guide mechanism for supporting the valve body and defining a pressing direction and a separation direction of the valve body to the direction substantially perpendicular to the peripheral surface around the opening;

wherein the gate valve further comprises a stopper which stops sliding movement of the sub-slider;

wherein after the sliding movement of the sub-slider is stopped by the stopper, the main slider further slides in an identical direction to that of the sliding movement of the sub-slider so that the protrusions of the pressing mechanisms press against the valve body;

wherein guide rails are provided on a surface of the sub-slider facing the main slider, and connection members are provided on a surface of the main slider facing the sub-slider; and wherein the sub-slider is slidably connected with the main slider via the guide rails and the connection members.

2. The gate valve of claim 1, further comprising a separation mechanism for moving the valve body away from the peripheral surface around the opening, wherein the separation mechanism includes an extensible/contractible body; and the extensible/contractible body is contracted when the valve body is pressed against the peripheral surface around the opening, and the extensible/contractible body is extended to separate the valve body from the peripheral surface around the opening.

3. The gate valve of claim 2, wherein the separation mechanism is provided at the sub-slider, and the support and guide mechanism has a shaft extending through the sub-slider, and the extensible/contractible body of the separation member is positioned between a facing surface of the sub-slider facing the main slider and a flange provided at a leading end of the shaft.

4. The gate valve of claim 3, wherein the flange compresses the extensible/contractible body when the valve body is pressed against the peripheral surface around the opening, and an extension force is applied to the flange from the contracted extensible/contractible body to separate the valve body from the peripheral surface around the opening.

5. The gate valve of claim 1, wherein the main slider has an engagement member to be engaged with the sub slider, and the engagement member is engaged with the sub slider stopped by the stopper when the main slider slides, thus allowing the sub-slider and the valve body to slide together.

6. The gate valve of claim 5, wherein when the main slider slides up while the engagement member is engaged with the sub-slider, the main slider, the sub-slider and the valve body moves in unison.

7. The gate valve of claim 1, wherein the pressed members of the valve body pressed by the pressing mechanism are arranged in an area corresponding to an inner side of the opening.

8. The gate valve of claim 7, wherein at least one of the pressed members is disposed at a central portion of the valve body corresponding to a central portion of the opening.

9. The gate valve of claim 1, further comprising a screen member provided on a side of the main slider opposite to a side thereof facing the valve body to confine elastic deformation of the main slider.

10. The gate valve of claim 1, wherein the main slider has an engagement member engageable with the sub-slider stopped by the stopper when the main slider slides, thus allowing the sub-slider and the valve body to slide together when the sub-slider is engaged with the engagement member.

11. The gate valve of claim 10, wherein when the main slider slides up while the engagement member is engaged with the sub-slider, the main slider, the sub-slider and the valve body moves in unison.

12. The gate valve of claim 1, wherein the main slider has an engagement member which is engaged with the sub-slider stopped by the stopper when the main slider slides up, thus allowing the sub-slider and the valve body to slide together.

13. The gate valve of claim 12, wherein when the main slider slides up while the engagement member is engaged with the sub-slider, the main slider, the sub-slider and the valve body moves in unison.

14. A substrate processing system comprising:
 a processing chamber having an opening through which a processing target object is loaded and unloaded, for performing a process on the target object while maintaining the target object in a vacuum state;
 a load lock chamber having an opening through which the target object is loaded and unloaded, wherein the atmospheric state and the vacuum state are maintained in the load lock chamber alternately; and
 a transfer chamber having an opening through which the target object is loaded and unloaded, for performing a transfer of the target object between the load lock chamber and the processing chamber,
 wherein the gate valve of claim 1 is used to open and close the opening of at least one of the processing chamber, the load lock chamber and the transfer chamber.

15. The substrate processing system of claim 14, wherein the main slider has an engagement member to be engaged with the sub-slider, and the engagement member is engaged with the sub-slider stopped by the stopper when the main slider slides, thus allowing the sub-slider and the valve body to slide together.

16. The substrate processing system of claim 15, wherein when the main slider slides up while the engagement member is engaged with the sub-slider, the main slider, the sub-slider and the valve body moves in unison.

17. The substrate processing system of claim 14, wherein the main slider has an engagement member engageable with the sub-slider stopped by the stopper when the main slider slides, thus allowing the sub-slider and the valve body to slide together when the sub-slider is engaged with the engagement member.

18. The substrate processing system of claim 17, wherein when the main slider slides up while the engagement member is engaged with the sub-slider, the main slider, the sub-slider and the valve body moves in unison.

19. The substrate processing system of claim 14, wherein the main slider has an engagement member which is engaged with the sub-slider stopped by the stopper when the main slider slides up, thus allowing the sub-slider and the valve body to slide together.

20. The substrate processing system of claim 19, wherein when the main slider slides up while the engagement member is engaged with the sub-slider, the main slider, the sub-slider and the valve body moves in unison.

\* \* \* \* \*